(12) United States Patent
Wong

(10) Patent No.: US 12,490,763 B2
(45) Date of Patent: Dec. 9, 2025

(54) PLANT MATERIAL LOADER

(71) Applicant: Charles Wong, Pasadena, CA (US)

(72) Inventor: Charles Wong, Pasadena, CA (US)

( * ) Notice: Subject to any disclaimer, the term of this patent is extended or adjusted under 35 U.S.C. 154(b) by 420 days.

(21) Appl. No.: 18/183,031

(22) Filed: Mar. 13, 2023

(65) Prior Publication Data

US 2024/0306701 A1    Sep. 19, 2024

(51) Int. Cl.
*A24C 5/39* (2006.01)
*A24C 5/06* (2006.01)

(52) U.S. Cl.
CPC ............... *A24C 5/395* (2013.01); *A24C 5/06* (2013.01); *A24C 5/399* (2013.01)

(58) Field of Classification Search
None
See application file for complete search history.

(56) References Cited

U.S. PATENT DOCUMENTS

| | | | |
|---|---|---|---|
| 2019/0075839 A1* | 3/2019 | Ghiotti ..................... | A24C 5/02 |
| 2020/0015516 A1* | 1/2020 | Simpson .................. | A24C 5/01 |
| 2020/0054066 A1* | 2/2020 | Kaufmann ............... | A24C 5/06 |
| 2020/0146336 A1* | 5/2020 | Lockwood ............... | A24C 5/393 |

* cited by examiner

*Primary Examiner* — Michael H. Wilson
*Assistant Examiner* — Daniel Edward Vakili
(74) *Attorney, Agent, or Firm* — Clement Cheng

(57) ABSTRACT

A plant material loader has a hopper, a hopper tray, a transfer tamper assembly, a transfer tray, a product retainer tray, product tubes and a loader tamper assembly. The hopper is configured to receive plant material. The hopper tray receives the plant material from the hopper. The hopper tray has hopper tray openings. The hopper tray has a hopper tray motion from a hopper position where the hopper tray is below the hopper to a transfer position where the hopper tray is away from the hopper and at a transfer tamper assembly. The transfer tamper assembly has transfer tamper rods and a transfer tray. The transfer tamper rods push the plant material from the hopper tray to the transfer tray.

18 Claims, 4 Drawing Sheets

PLANT MATERIAL LOADER

FIELD OF THE INVENTION

The present invention is in the field of plant material loaders.

DISCUSSION OF RELATED ART

Traditionally, plant material loaders for tobacco and other products have relied on a continuous feed process. A variety of United States patents show the traditional construction process. The continuous feed process has a drawback in that it can only a load or build one product tube at a time.

SUMMARY OF THE INVENTION

The present invention plant material loader is a batch processing system that has a hopper, a hopper tray, a transfer tamper assembly, a transfer tray, a product retainer tray, product tubes and a loader tamper assembly. The hopper is configured to receive plant material. The hopper tray receives the plant material from the hopper. The hopper tray has hopper tray openings. The hopper tray has a hopper tray motion from a hopper position where the hopper tray is below the hopper to a transfer position where the hopper tray is away from the hopper and at a transfer tamper assembly. The transfer tamper assembly has transfer tamper rods and a transfer tray. The transfer tamper rods push the plant material from the hopper tray to the transfer tray. The transfer tray moves from a transfer position below the hopper tray at the transfer tamper assembly to a loading position where the transfer tray is above a product retainer tray. The product tubes are retained to the product retainer tray. A loader tamper assembly has loader tampers that presses the plant material from the transfer tray to the product tubes at the loading position.

The hopper tray has hopper tray slots extending parallel with the hopper tray motion. The hopper tray slots are aligned to the hopper tray openings. Hopper tray slot bulges are formed on the product hopper tray slots. The hopper tray slot bulges are aligned with the hopper tray openings. A transfer plate is formed at the transfer position so that the transfer plate supports the hopper tray. The transfer plate preferably retains the transfer tray. The transfer plate has transfer plate openings that allow the transfer tamper rods to push the plant material through the hopper tray openings, through the transfer plate openings and into the transfer tray openings.

The transfer tray is mounted to slide below the loader tamper plate. The loader tamper plate has a loader tamper tip guide. The loader tampers press the plant material from the transfer tray openings into the product tubes. The transfer tray has transfer tray ridges. The transfer tray openings are formed in the transfer tray ridges. The transfer tray ridges slide into transfer channels formed on the transfer plate. The hopper further includes a roller screed that presses plant material into the hopper tray. The hopper further includes hopper baffles that direct material downwardly. The hopper baffles are mounted perpendicularly to the hopper tray motion. The transfer tray has a movable transfer tray floor that closes the transfer tray openings during transfer at a transfer tamper assembly and opens the transfer tray openings during loading at a loader tamper assembly. The product retainer tray is mounted to a product retainer tray horizontal slide mount and a product retainer tray vertical slide mount. The product retainer tray slides on the product retainer tray vertical slide mount upwardly to engage the product tube upper edges to transfer tray indents formed on the transfer tray.

The following call out list of elements can be a useful guide in referencing the element numbers of the drawings.
11 Starting Area
12 Ending Area
21 Hopper
22 Hopper Opening
23 Hopper Baffle
24 Baffle Opening
25 Roller Screed
26 Recovery Bin
30 Hopper Tray
31 Upper Tray Flat Portion
32 Hopper Tray Slot Bulge
33 Hopper Tray Slide Mount
34 Hopper Floor
35 Hopper Tray Slot
36 Hopper Tray Slot Portion
40 Transfer Tamper Assembly
41 Transfer Tamper Rod
42 Transfer Plate
43 Transfer Tray Slot
44 First Transfer Plate Channel
45 Second Transfer Plate Channel
46 Third Transfer Plate Channel
47 Fourth Transfer Plate Channel
48 Fifth Transfer Plate Channel
49 Sixth Transfer Plate Channel
50 Transfer Tray
51 Transfer Tray Push Pull Rod
52 Transfer Tray Push Pull Rod Rail
53 Transfer Carriage
54 Carriage Frame
55 Carriage Motor
56 Transfer Tray Slide Motion
57 Transfer Tray Floor
58 Transfer Tray Table
59 Transfer Tray Ridge
60 Loader Tamper Assembly
61 First Loader Rail
62 Second Loader Rail
63 Loader Rod Retainer
64 Loader Tamper Rod
65 Upper Loader Tamper Guide
66 Loader Rail Guide Frame
67 Loader Tamper Tip Guide
68 Loader Tamper Plate
69 Loader Rod Tip 70 Product Retainer Tray
71 First Product Tray Handle
72 Second Product Tray Handle
73 Product Tray Horizontal Slide Mount
74 Product Tray Vertical Slide Mount
75 Flared Upper Opening
76 Tube Retainer
77 Product Tray Lower Retainer
78 Upper Opening Notch
79 Tray Gap
81 Transfer Tray Indents
82 Transfer Tray Channel
83 Transfer Plate Lower Beam
88 Plant Material
89 Cutoff Channel
90 Product Tube
91 Product Tube Upper Edge
101 Transfer Tamper Motion
102 Loader Tamper Motion
103 Hopper Tray Motion
104 Transfer Tray Motion
155 Hopper Tray Openings
156 Loader Tamper Plate Openings
157 Transfer Tray Openings
158 Transfer Tamper Plate Opening
159 Transfer Tray Groove
160 Transfer Plate Beam Set

DETAILED DISCUSSION OF THE PREFERRED EMBODIMENT

Figure 1:
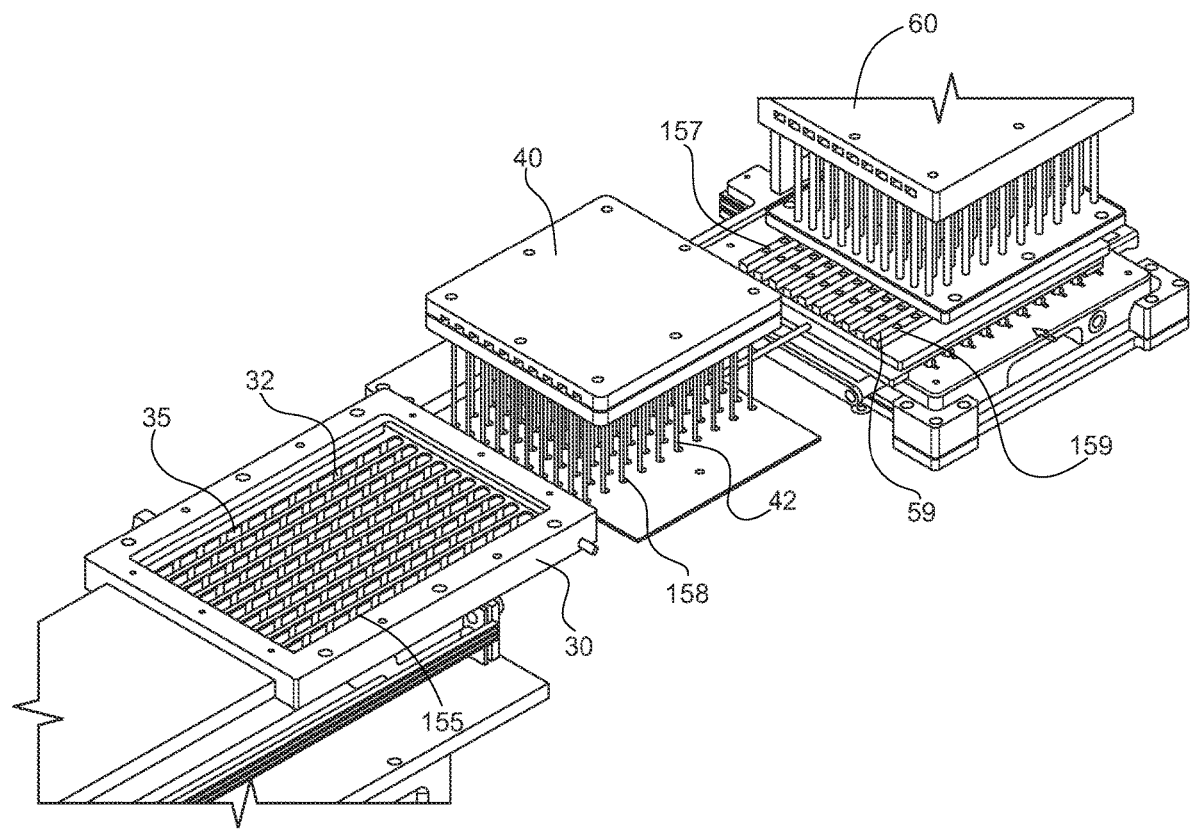
FIG. 1 is a perspective view of the present invention.
Figure 2:
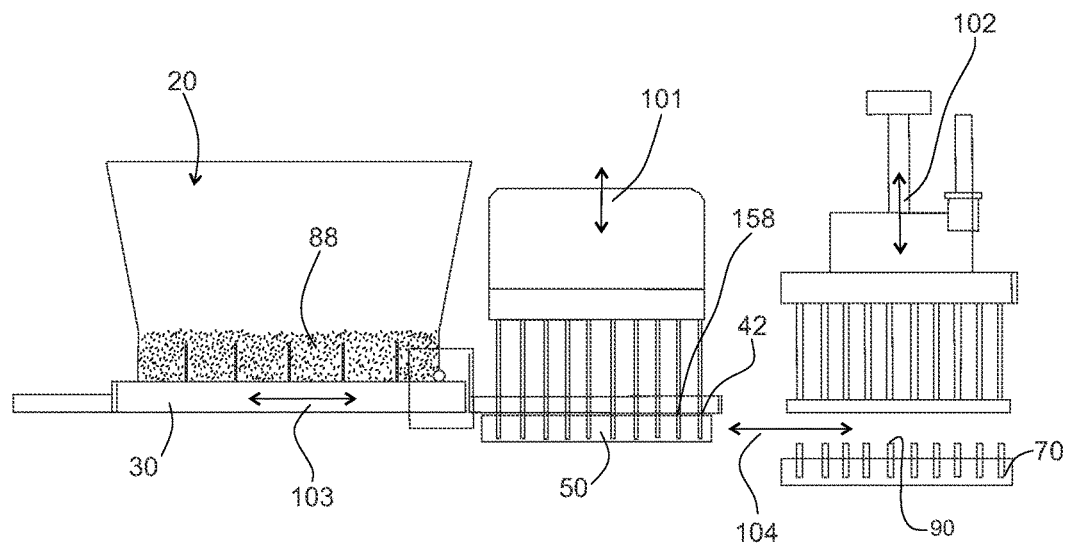
FIG. 2 is a side view diagram of the present invention.

As seen in FIGS. 1-2, the material packer system has a hopper tray 30 that receives loose plant material and then transfers it to a transfer tray, which then transfers the material to tubes on a product tray. A plant material 88 such as granular and fibrous material such as lose plant material such as hemp, flower, tobacco or the like that can be packed into electronic heated cigarette product tubes 90 via tampers. A tamper is a tool for pressing a loose material or substance into a more compact and uniform shape. A hopper tray 30 has a flared upper opening that receives material by gravity. A hopper tray motion 103 is a horizontal sliding motion of the hopper tray. The hopper tray 30 slides from a first position within the hopper to a second position where the hopper tray 30 is above a transfer tray 50. When the hopper tray 30 is above the transfer tray 50, the transfer tamper assembly 40 presses material in the hopper tray 30 into a transfer tray 50. The transfer tray 50 then has a transfer tray motion 104 such that the transfer tray 50 is located over the product tray 70. The transfer tray 50 has plant material 88 that is transferred via the loader tamper motion 102 which is a vertical motion pressing the plant material from the transfer tray 50 into the product retainer tray 70. The transfer tray 50 has transfer tray openings 157.

The hopper tray 30 has multiple slots for receiving the plant material 88. The hopper tray slots 35 are formed in the hopper tray 30 and are oriented lengthwise in the same direction as the hopper tray motion 103. The hopper tray slots 35 have hopper tray slot bulges 32 at regular intervals. The hopper tray slot bulges 32 to align with hopper tray openings 155 and can form a funnel shape. An array of hopper tray slot bulges 32 can be formed on the hopper tray 30. The hopper tray 30 can have ten hopper tray slots 35 and each of the hopper tray slots can have a hopper tray slot bulge 32. In a ten by ten array, a total of one hundred hopper tray slot bulges are preferably formed in a relatively round profile. The cylindrical shaped bulges have a diameter that is greater than a width of the hopper tray slots 35. The one hundred bulges allow the transfer tamper assembly 40 to transfer one hundred per batch process. The transfer tamper assembly 40 has a transfer plate 42 with transfer plate openings. Each of the transfer plate openings corresponds with a transfer tamper, and each of the transfer tamper rods 41 corresponds with a hopper tray slot bulge 32 and consequently each hopper tray opening 155. The batch process handling one hundred at a time is thus 100 times faster than a traditional linear process that processes the tamping one at a time.

The hopper tray 30 receives the plant material 88 as the hopper tray 30 reciprocates to a loading position. The plant material 88 slides into the cylindrical shaped bulges and packs into cylindrical shaped chunks of plant material 88. Each of the hopper tray slots 35 fills with material. The hopper tray slots are overflowing when the hopper tray moves from the loading position to the transfer position.

Figures 3, 4:
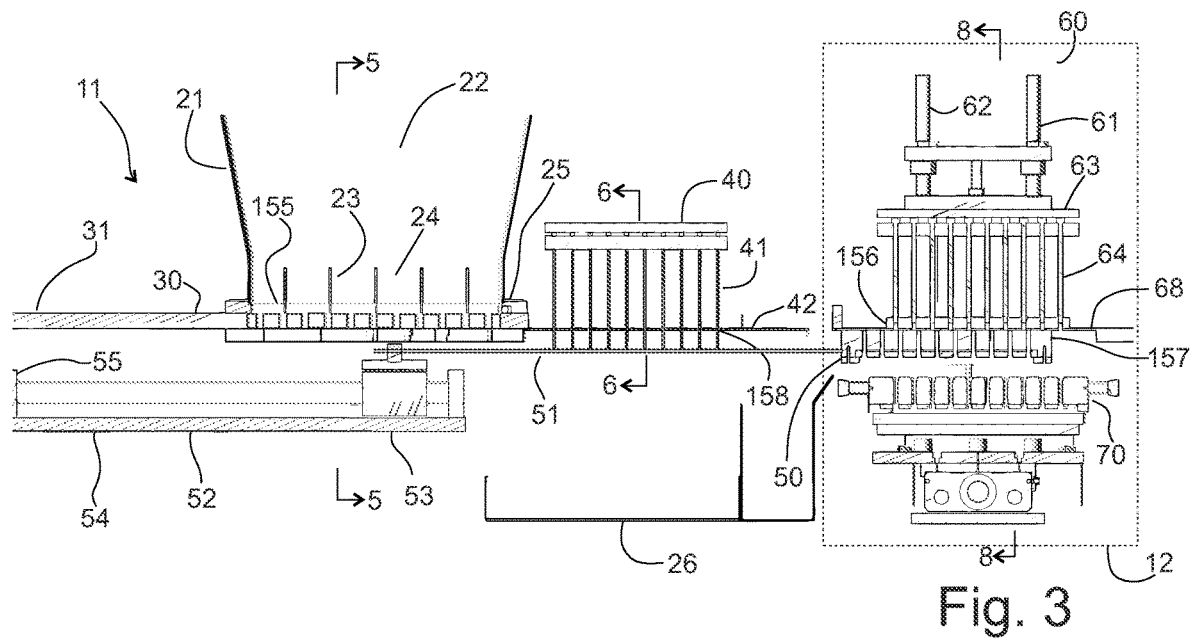
FIG. 3 is a detailed side view of the present invention plant material loader.
FIG. 4 is a close-up view of the loader tamper assembly.

As seen in FIGS. 3-4, the manufacturing process begins at a starting area 11 and ends at an ending area 12. After material is loaded into the hopper opening 22, the hopper tray slots pass under the roller screed 25, and the plant material 88 is pressed into the cylindrical shaped bulges. The transfer tamper rod 41 then presses to transfer the plant material 88 which is pressed into the cylindrical shaped bulges from the hopper tray 30, through the transfer plate 42 and then into the transfer tray 50. The hopper tray 30 has a hopper tray flat portion 31 that slides forward to push material forward in the hopper 22. The plant material 88 that is pushed forward is pushed against hopper baffles 23 which are oriented perpendicularly to the hopper tray motion 103. The hopper baffles 23 can be formed as a rectangular plates that are oriented perpendicularly to the hopper tray slots 35. The hopper baffles 23 have baffle openings 24 such as a total of six baffle openings in between a total of five baffles. The five baffles can be formed of metal in a flat planar shape that extends from a left side of the hopper 21 to a right side of the hopper 21. The baffle openings 24 receive plant material 88 and move the plant material 88 into the hopper tray slots 35 and the hopper tray slot bulges 32 when the hopper tray 30 reciprocates. The hopper tray 30 is formed as an elongated plank and mounted for horizontal reciprocation underneath the hopper 21. As more material passes through the hopper opening 21, the hopper baffles 23 redirect material flow downwardly. The roller screed 25 is preferably mounted on a frame at the front edge of the hopper 21. The roller screed 25 is preferably mounted to a frame that retains the hopper 21. As the hopper tray 30 slides forwardly, the roller screed 25 presses material into the hopper tray slots 35 of the hopper tray 30. As the hopper tray 30 slides rearwardly from the transfer position to the hopper position, the hopper baffles 23 direct material flow downwardly into the hopper tray slots 35 and the hopper tray slot bulges 32.

When the hopper tray 30 is in the tamper transfer position which is a forward position of the hopper tray, the transfer tray 50 retracts rearwardly to the transfer position from its loading position so that the hopper tray 30 is directly above the transfer tray 50. The hopper tray slot bulges 32 align with the transfer tamper plate openings 158 and align with the transfer tray openings 157. Fine adjustment of the horizontal travel of the transfer tray motion 104 preferably utilizes a transfer tray push pull rod 51. The transfer tray push pull rod 51 can be adjustably attached to a transfer carriage 53 such as by a coupler with a set screw. The transfer carriage 53 is in turn mounted to a transfer tray push pull rod rail 52 and the transfer tray push pull rod rail 52 is mounted to a carriage frame 54. The transfer carriage 53 can be actuated with a carriage motor 55. Thus, during initial setup, a transfer tray 50 can have precise alignment to the hopper tray 30.

Each of the transfer tamper rods 41 are mounted to the transfer tamper assembly 40 on a frame. The frame reciprocates up and down as transfer tamper motion 101. As the transfer tray 50 moves laterally, any dislodged material falls into a recovery bin 26 below the transfer tray 50. The transfer tray 50 receives the material and transfers it to the loader tamper assembly 60. The loader tamper assembly has a loader first rail 61 and a loader second rail 62. The loader tamper rods 64 are mounted to a loader rod retainer 63.

The loader tamper plate 68 has loader tamper plate openings 156 that align with the loader tamper rods 64. The loader tamper rods 64 push material from the transfer tray 50 into product tubes 90. Therefore, the loader tamper rods 64 are aligned with the transfer tamper plate openings 158 and the transfer tray openings 157 and the product tubes 90 when the transfer tray 50 is in the loading position.

As seen in FIG. 4, the loader rail guide frame 66 is mounted to the first loader rail 61 and the second loader rail 62 for vertical reciprocation. The upper loader tamper guide 65 can be a fixed part of the frame which stabilizes the loader tamper rods 64. The loader tamper rods 64 have loader rod tips 69 that press the material through a loader tamper plate 68. The loader rod tips 69 pass through a loader tamper tip guide 67 of the loader tamper plate 68. The transfer tray slide motion 56 aligns the transfer tray above the product retainer tray 70. The product retainer tray 70 has a product tray vertical slide mount 74 and a product tray horizontal slide mount 73 that can actuate horizontally and vertically so as to engage the product tubes 90 a lower surface of the transfer tray 50. The transfer tray 50 may have a reciprocating transfer tray floor 57 that seals the material from falling out when the transfer tray 50 is in motion over the product retainer tray 70. After loading, the product retainer tray 70 can be manually removed at a first product retainer tray handle 71 and a second product retainer tray handle 72, or the product retainer tray 70 can have a fully automatic process via the product tray horizontal slide mount 73 which can move the product retainer tray 70 to another station for further product processing. The loader tamper tip guide 67 can be formed of a high density polyethylene slab that is mounted to a steel loader tamper plate 68. The loader tamper tip guide 67 is preferably tight such that the loader rod tip 69 fits snugly within the loader tamper tip guide 67. In contrast to the upper loader tamper guide 65, the loader tamper tip guide 67 is stationary.

Figure 5:
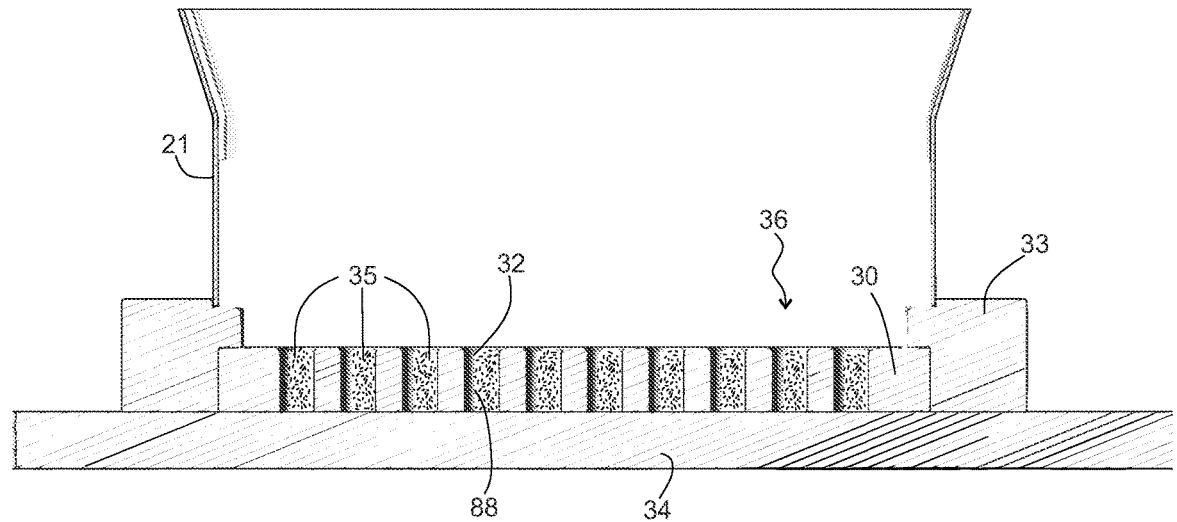
FIG. 5 is a rear cross-sectional view of the hopper system.
Figure 6:
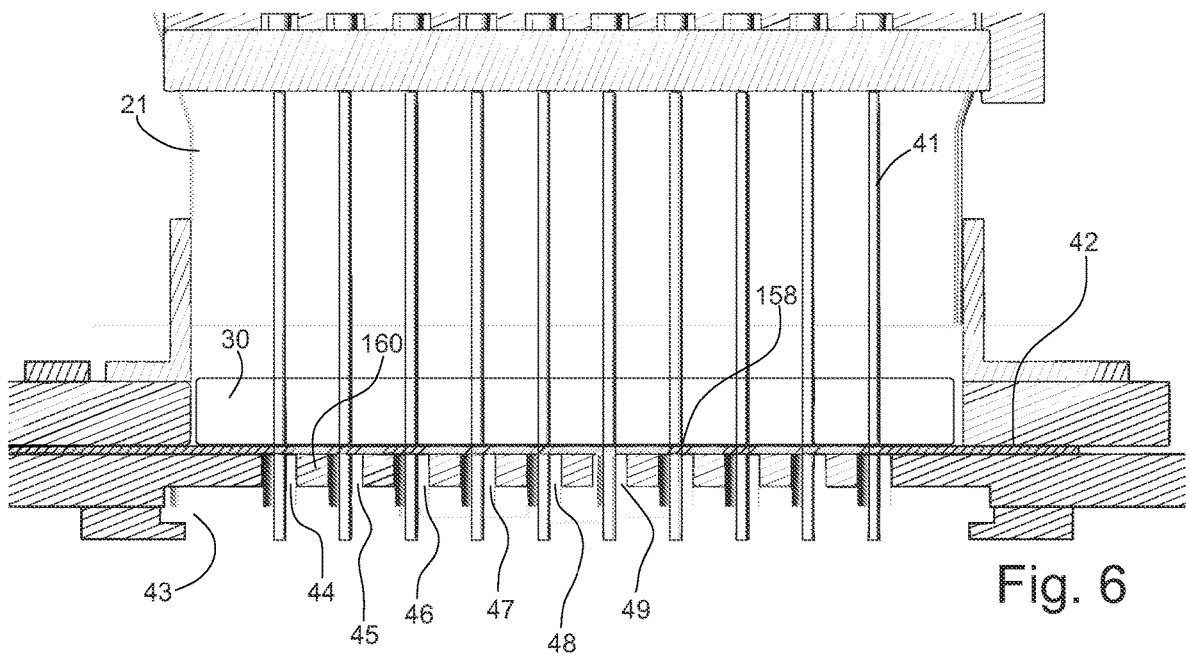
FIG. 6 is a front cross-sectional view of the transfer tamper assembly with the transfer tray away from the transfer plate.

As seen in FIGS. 5-6, a front cross-sectional view of a hopper 21 shows the hopper tray slots 35 and the hopper tray slot bulges 32 of the hopper tray slot portion 36. The hopper tray 30 slides within the hopper tray slide mount 33 bounded by a hopper floor 34. Plant material 88 fits into the hopper tray slots 35 and accumulates in the hopper tray slot bulges 32.

As seen in FIG. 6, the transfer rods 41 pass through the transfer plate 42 at the transfer tamper openings 158. Below each row of transfer tamper openings 158 are channels between the transfer plate beams of the transfer plate beam set 160. The transfer tray slot 43 receives the transfer tray below the transfer plate 42, while the hopper tray 30 slides over the top of the transfer plate 42. The transfer channels include a first transfer plate channel 44, a second transfer plate channel 45, a third transfer plate channel 46, a fourth transfer plate channel 47, a fifth transfer plate channel 48, and a sixth transfer plate channel 49. Preferably, ten transfer plate channels are formed with transfer plate beams between them on an underside of the transfer plate 42.

Figure 7:
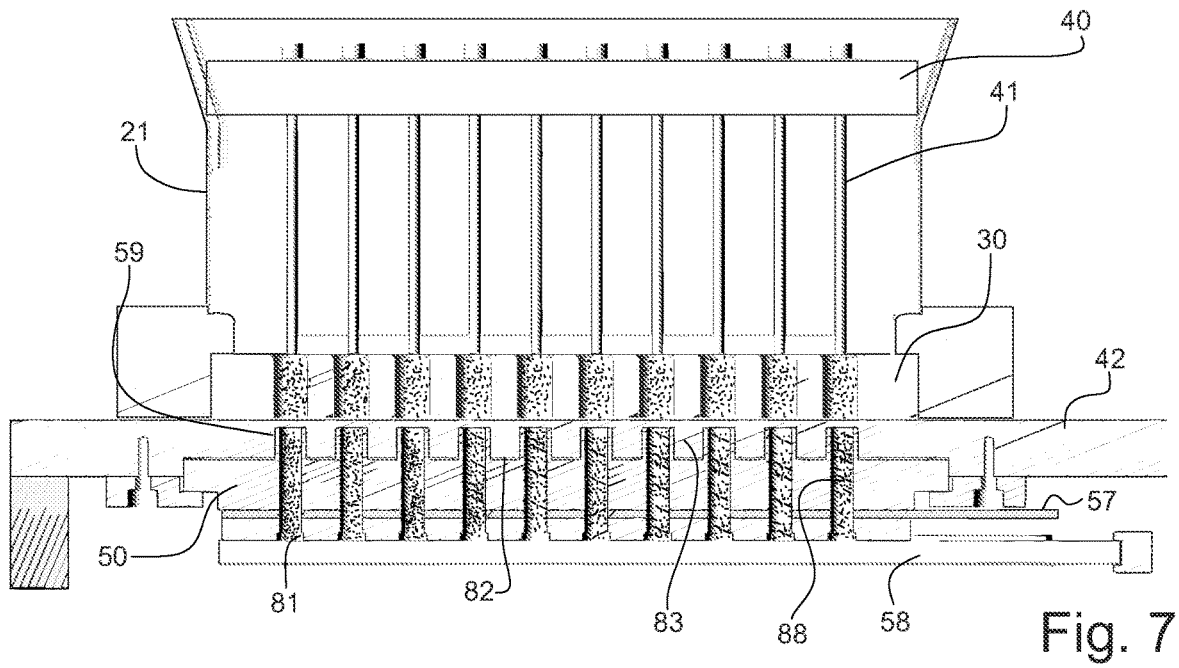
FIG. 7 is a front cross-sectional view of the transfer tamper assembly with the transfer tray engaged to the transfer plate.
Figure 8:
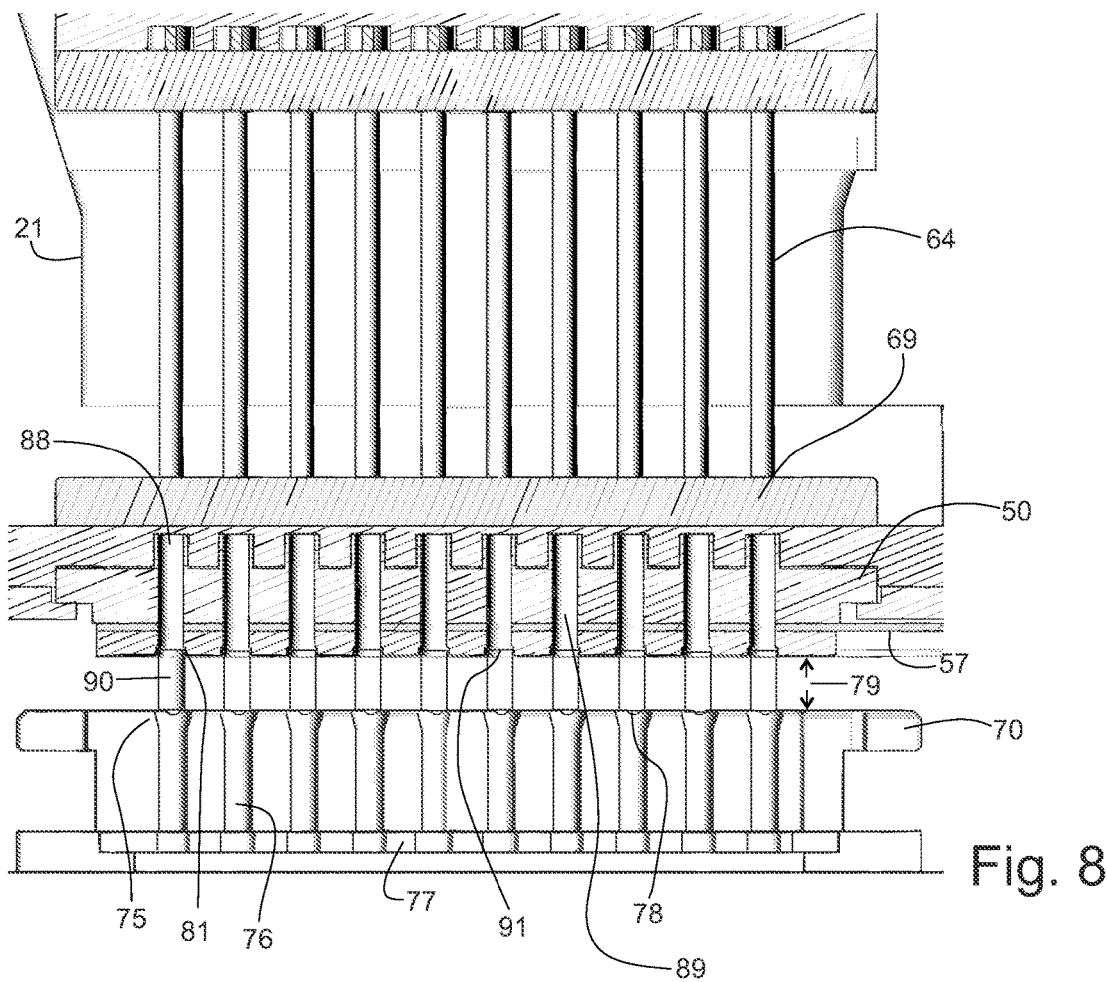
FIG. 8 is a front cross-sectional view of the loader tamper assembly.

As seen in FIGS. 7-8, the transfer plate channels receive transfer tray ridges 59 that are oriented in the direction of movement of the hopper tray 30 and the transfer tray 50. The transfer tray ridges 59 of the transfer tray 50 fit between the transfer plate lower beams 83 of the transfer plate 42. The transfer plate lower beams 83 fit into the transfer tray channels 82 of the transfer tray 50 formed between the transfer tray ridges 59.

The transfer tray floor 57 can be formed as a sliding plate that closes the openings in the transfer tray 50. The transfer tray floor 57 can retain the plant material 88 when the plant material 88 is being packed into the transfer tray 50. When the transfer tray 50 is moved over the product to 90, then the transfer tray floor 57 can be removed or opened to allow passage of plant material to pack into the product tube 90. The lower side of the transfer tray 50 has transfer tray tube indents 81 that can receive the product tubes 90. Preferably one hundred can be filled in a batch. The transfer tray floor 57 opening exposes a cutoff channel 89 so that the loader rod tip 69 presses the plant material 88 from the transfer tray, past the transfer tray floor 57 and into the product tube 90.

The product tube 90 preferably fits in tube retainers 76 formed in a decimal array. The tube retainers 76 are hollow passengers with flared upper openings 75. Each of the flared upper openings 75 preferably has an upper opening notch 78 to allow a ease of insertion and removal. A tray gap 79 provides an upper exposed portion of the product tube 90 during filling. The product retainer tray 70 can be raised slightly during filling so that the product tube upper edge 91 of the product tube 90 fits into the transfer tray indents 81. The transfer tray indents 81 are preferably circumferentially formed on the lower surface of the cutoff channels 89. The transfer tray indents 81 are thus formed on a lower surface of the transfer tray 50 at each transfer tray opening 157. After the product tubes are loaded, the tubes can be sent to subsequent stations such as a station to seal the product tube upper edges 91 with a thin paper cover.

The invention claimed is:

1. A plant material loader comprising:
   a. a hopper configured to receive plant material;
   b. a hopper tray receiving the plant material from the hopper, wherein the hopper tray has hopper tray openings, wherein the hopper tray has a hopper tray motion from a hopper position where the hopper tray is below the hopper to a first transfer position where the hopper tray is away from the hopper and at a transfer tamper assembly;
   c. the transfer tamper assembly including transfer tamper rods and a transfer tray, wherein the transfer tamper rods push the plant material from the hopper tray to the transfer tray;
   d. a product retainer tray, wherein the transfer tray moves from a second transfer position below the hopper tray at the transfer tamper assembly to a loading position where the transfer tray is above the product retainer tray;
   e. product tubes, wherein the product tubes are retained to the product retainer tray; and
   f. a loader tamper assembly, wherein the loader tamper assembly has loader tampers that presses the plant material from the transfer tray to the product tubes at the loading position.

2. The plant material loader of claim 1, wherein the hopper tray has hopper tray slots extending parallel with the hopper tray motion, wherein the hopper tray slots are aligned to the hopper tray openings.

3. The plant material loader of claim 2, further including hopper tray slot bulges formed on the product hopper tray slots, wherein the hopper tray slot bulges are aligned with the hopper tray openings.

4. The plant material loader of claim 1, further including a transfer plate at the transfer position, wherein the transfer plate supports the hopper tray, wherein the transfer plate retains the transfer tray, wherein the transfer plate has transfer plate openings that allow the transfer tamper rods to push the plant material through the hopper tray openings, through the transfer plate openings and into the transfer tray openings.

5. The plant material loader of claim 4, further including a loader tamper plate, wherein the transfer tray is mounted to slide below the loader tamper plate, wherein the loader tamper plate has a loader tamper tip guide, wherein the loader tampers press the plant material from the transfer tray openings into the product tubes.

6. The plant material loader of claim 5, wherein the transfer tray has transfer tray ridges, wherein the transfer tray openings are formed in the transfer tray ridges, wherein the transfer tray ridges slide into transfer channels formed on the transfer plate.

7. The plant material loader of claim 1, wherein the hopper further includes a roller screed that presses plant material into the hopper tray.

8. The plant material loader of claim 1, wherein the hopper further includes hopper baffles that direct material downwardly, wherein the hopper baffles are mounted perpendicularly to the hopper tray motion.

9. The plant material loader of claim 1, wherein the transfer tray has a movable transfer tray floor that closes the transfer tray openings during transfer at the transfer tamper assembly and opens the transfer tray openings during loading at the loader tamper assembly.

10. The plant material loader of claim 1, wherein the product retainer tray is mounted to a product tray horizontal slide mount and a product tray vertical slide mount, wherein the product retainer tray slides on the product tray vertical slide mount upwardly to engage the product tube upper edges to transfer tray tube indents formed on the transfer tray.

11. The plant material loader of claim 10, wherein the hopper tray has hopper tray slots extending parallel with the hopper tray motion, wherein the hopper tray slots are aligned to the hopper tray openings.

12. The plant material loader of claim 11, further including hopper tray slot bulges formed on the product hopper tray slots, wherein the hopper tray slot bulges are aligned with the hopper tray openings.

13. The plant material loader of claim 12, further including a transfer plate at the transfer position, wherein the transfer plate has transfer plate openings that allow the transfer tamper rods to push the plant material through the hopper tray openings, through the transfer plate openings and into the transfer tray openings.

14. The plant material loader of claim 13, further including a loader tamper plate, wherein the transfer tray is mounted to slide below the loader tamper plate, wherein the loader tamper plate has a loader tamper tip guide, wherein the loader tampers press the plant material from the transfer tray openings into the product tubes.

15. The plant material loader of claim 14, wherein the transfer tray has transfer tray ridges, wherein the transfer tray openings are formed in the transfer tray ridges, wherein the transfer tray ridges slide into transfer channels formed on the transfer plate.

16. The plant material loader of claim 12, wherein the hopper further includes a roller screed that presses plant material into the hopper tray.

17. The plant material loader of claim 12, wherein the hopper further includes hopper baffles that direct material downwardly, wherein the hopper baffles are mounted perpendicularly to the hopper tray motion.

18. The plant material loader of claim 17, wherein the transfer tray has a movable transfer tray floor that closes the transfer tray openings during transfer at the transfer tamper assembly and opens the transfer tray openings during loading at the loader tamper assembly.

* * * * *